United States Patent Office 3,655,755
Patented Apr. 11, 1972

3,655,755
N-FORMYL-α-HALO-ACETANILIDES
John F. Olin, Manchester, Mo., assignor to Monsanto Company, St. Louis, Mo.
No Drawing. Continuation-in-part of application Ser. No. 624,110, Jan. 27, 1967, which is a division of application Ser. No. 348,862, Mar. 2, 1964. This application May 20, 1970, Ser. No. 39,176
Int. Cl. C07c *103/32*
U.S. Cl. 260—562 B         12 Claims

ABSTRACT OF THE DISCLOSURE

Compounds of the formula

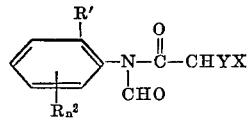

wherein R′ is alkyl; $R^2$ is halogen, alkyl or alkoxy; $n$ is an integer 0 to 4, X is chlorine, bromine and iodine and Y is hydrogen or halogen.

These compounds have herbicidal activity.

N-FORMYL-α-HALOACETANILIDES

This application is a continuation-in-part of copending application Ser. No. 624,110, filed Jan. 27, 1967, now U.S. Patent 3,544,305, which in turn is a division of application Ser. No. 348,862, filed Mar. 2, 1964, and now abandoned.

This invention relates to novel N-formyl-α-haloacetanilides which possess herbicidal activity.

The novel compounds of this invention are of the formula

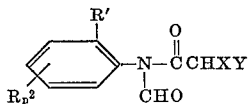

wherein R′ is alkyl having a maximum of 10 carbon atoms; $R^2$ is selected from the group consisting of halogen, alkyl having not more than 6 carbon atoms and alkoxy having not more than 4 carbon atoms; $n$ is an integer 0 to 4; X is selected from the group consisting of chlorine, bromine and iodine; and Y is selected from the group consisting of hydrogen and halogen.

In the N-formyl α-haloacetanilides of this invention $R^1$ in the formula above is alkyl, preferably tertiary alkyl, having not more than 10 carbon atoms, not more than 5 carbon atoms being most desirable. Examples of some suitable alkyl radicals include: methyl, ethyl, n-propyl, isopropyl, n-butyl, isobutyl, tert-butyl, tert-amyl, 1,1,2-trimethylpropyl, 1,1-dimethylbutyl, 1,1-dimethylamyl, 1,1,2-trimethylbutyl, 1,1,3,3-tetramethylbutyl, 1,1,2,3-tetramethylbutyl, 1,1,2,2-tetramethylbutyl, and 1,1-dimethylloctyl groups.

In the formula $R^2$ as a halogen atom can be chlorine, bromine, iodine or fluorine, but is preferably chlorine or bromine. As an alkyl group, $R^2$ can be tertiary alkyl but is preferably primary or secondary alkyl, and preferably contains not more than 6 carbon atoms. Examples of suitable alkyl radicals include methyl, ethyl, isopropyl, n-butyl, sec-butyl, tert-butyl, n-amyl, tert-amyl and n-hexyl groups. As an alkoxy group, $R^2$ preferably contains not more than 4 carbon atoms. Examples of suitable alkoxy radicals include: methoxy, ethoxy, n-propoxy, isopropoxy, n-butoxy, isobutoxy and tert-butoxy. Where there is only one $R^2$ it is preferred that it be in the ortho position, and where there are two $R^2$ groups it is preferred that one be in the ortho position and the other be in a meta position.

In the formula $n$ can be 0, 1, 2, 3 or 4; however, it is preferred that $n$ be 1 or 2.

In the formula X can be chlorine, bromine and iodine with the two atoms named first, i.e., chlorine and bromine, being preferred.

In the formula Y can be a hydrogen, chlorine, bromine, iodine or fluorine atom, but is preferably the hydrogen atom.

The compounds of the invention of the general formula above are prepared by reacting a compound of the formula

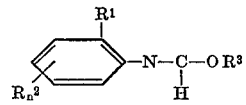

wherein $R^1$, $R^2$ and $n$ are as defined hereinabove and $R^3$ is alkyl, having a maximum of 6 carbon atoms and preferably 2 carbon atoms, with an α-haloacetyl halide of the formula CHXYCOX′ wherein X and Y are as defined hereinabove, and X′ is a halogen atom, preferably a chlorine or bromine atom. Normally it is preferred to carry out the reaction in the presence of an inert solvent such as a saturated aliphatic or aromatic solvent, e.g., hexane, heptane, benzene, toluene, xylenes and the like; however, a solvent is not required. In most cases, depending on the particular reactants involved, an exothermic reaction occurs at room temperature (20–25° C.) when the reactants are mixed. Usually in order to complete the reaction in a reasonably short time including the splitting off of alkyl halide, it is preferred to heat the reactants at a temperature in the range of about 50–100° C. for a period of about a few minutes to several hours; however, a much longer time of reaction can be used from about 24 hours to a number of days and no heating is required. Heating can be carried out at higher temperatures up to about 200° C. to complete the reaction faster, but normally it is preferred not to heat the reactants to a temperature of more than 150° C. to avoid any substantial decomposition of the reactants or desired product. The crude reaction mixture can be used in herbicidal composition, but usually it is preferred to separate and purify the desired product. Purification is carried out by crystallization or vacuum distillation depending on the particular product involved, and other conventional forms of separation such as adsorption, absorption, or extractive distillation, etc. may be applicable.

The compounds of the invention are especially useful as biological toxicants, especially as herbicides, primarily pre-emergent herbicides and at low rates of application as grass-specific pre-emergent herbicides; however, the compounds also exhibit contact herbicidal activity.

The invention will be more clearly understood from the following detailed description of specific examples thereof.

EXAMPLE 1

This example describes the preparation of an intermediate used in the preparation of a compound of the invention and is a typical preparation for the intermediate products used to prepare other compounds of the invention. This intermediate product is ethyl N-(2-tert-butyl-6-methylphenyl)formimidate. This intermediate product was prepared by the method of U.S. 2,909,553 in the absence of a catalyst. 233 g. (1.57 moles) of ethyl orthoformate and 245 g. (1.5 moles) of 2-tert-butyl-6-methylaniline were heated in a flask which had attached thereto a distillation column. Ethyl alcohol began to distill over from the distillation column when the pot temperature reached 130° C. Heating was continued for a period of 20 hours at temperatures in the range of 145–180° C. Then over a period of ½ hour the contents of the flask were brought to a temperature of 198° C. Total alcohol recovered by distillation from the flask was 125 g. (2.7) moles). The liquid remaining in the flask was cooled and distilled under vacuum in a 10 mm. x 48 inch packed distillation column. The distillation and cuts therefrom are summarized as follows:

| Cut No. | B.P., °C. | Pressure, mm. of Hg | Wt., g. | $n_D^{25}$ |
|---|---|---|---|---|
| 1 | 40–70 | 10 | 25 | (1) |
| 2 | 70–109 | 10–6.5 | 5 | |
| 3 | 109–110.5 | 6.5 | 4 | 1.5340 |
| 4 | 110–122 | 6.5 | 20 | 1.5280 |
| 5 | 121–125 | 6.5 | 4 | 1.5154 |
| 6 | 125–125.5 | 6.5 | 287 | 1.5116 |

1 Orthoformate.

The distillation pot was dry at the end of the collection of Cut 6. Cut No. 6, weighing 287 g., was the desired product and the yield based on the aniline charged was 87.2%. On cooling the product (Cut 6) solidified in long, thick needles having an M.P. 34–35° C. (corrected).

EXAMPLE 2

This example describes the preparation of 2-bromo-2′-tert-butyl-N-formyl-6′-methylacetanilide. 110 g. (0.55 mole) of bromoacetyl bromide and 175 g. of heptane were placed in a liter 4-neck flask fitted with a reflux condenser, stirrer, dropping funnel and thermometer. With stirring, the addition of 109.2 g. (0.5 mole) of ethyl N-(2-tert-butyl-6-methylphenyl)formimidate (made according to Example 1) was begun from the dropping funnel. The reaction was exothermic and the temperature rose quickly from 18 to 21° C. The temperature was raised by heating the contents of the flask to 65° C. The exothermic reaction continued and the temperature of the reaction mixture rose to 85° C. during the 15 minute period when the formimidate was being added. A reflux of ethyl bromide was apparent when the addition of the formimidate was about one-half completed. After the completion of the addition of the formimidate, the reaction mixture was gently refluxed for ½ hour at 80° C. and it became pale straw colored. After cooling the reaction mixture to 70° C., it was transferred to a beaker and placed in the deep freeze where it quickly crystallized. After two hours the crystallized reaction mixture was removed from the deep freeze, broken up or dispersed, was filtered and the crystallized material on the filter was washed with two 100 ml. portions of cold hexane. The air-dried crystalline product weighed 150.5 g. and had a melting point of 116–116.5° C. Elemental analysis of this product yielded the following results:

Calc'd for $C_{14}H_{18}BrNO_2$ (percent): C, 53.9; H, 5.8; Br, 25.6. Found (percent): C, 53.8; H, 5.7; Br, 25.6.

EXAMPLE 3

This example describes the preparation of 2′-tert-butyl-2-chloro-N-formyl-6′-methylacetanilide. In the same type of apparatus as was used in Example 2, 60 g. of chloroacetyl chloride was placed in the flask and 150 g. of n-heptane. The contents of the flask were heated to 35° C. and addition from the dropping funnel was begun of 109.2 g. (0.5 mole) of ethyl N-(2-tert-butyl-6-methylphenyl)formimidate prepared as in Example 1. The formimidate was added over a period of 15 minutes with the temperature rising exothermically in the flask to 65° C. Ethyl chloride began to come off when about one-half of the formimidate had been added. Nearing the end of the formimidate addition the product began to crystallize out. After the completion of the formimidate addition the reaction mixture was refluxed for one hour with the temperature being increased from 60 to 95° C. When the reaction mixture had cooled to 90° C. the slurry of crystals was transferred to a beaker and placed in the deep freeze until it had cooled to about 10° C. The reaction mixture was then filtered, the crystals were washed with cold hexane, and the air-dried crystalline product weighing 123.5 g. and had a melting point of 127.5–128.5° C. (corrected). An elemental analysis of the product yielded the following results:

Calc'd for $C_{14}H_{18}ClNO_2$ (percent): C, 62.8; H, 6.8; Cl, 13.2. Found (percent): C, 62.8; H, 7.1; Cl, 13.2.

If in the experiment of Example 3 instead of ethyl N-(2-tert-butyl-6-methylphenyl)formimidate, there is used an equimolar amount of ethyl N-(2-tert-butyl-6-methoxyphenyl)formimidate, the resultant product is 2′-tert-butyl-2-chloro-N-formyl-6′-methoxyacetanilide.

If in the experiment of Example 3 instead of chloroacetyl chloride, there is used an equimolar amount of chloroacetyl iodide or chloroacetyl fluoride, the resultant product is the same.

EXAMPLE 4

This example describes the preparation of 2-bromo-N-formyl-2′-methylacetanilide. In the experiment of this example similar equipment was used as was used in Example 2. To the flask was added 55 g. (0.275 mole) of bromoacetyl bromide and 100 g. of n-heptane. After heating the reaction mixture in the flask to 65° C., 41 g. (0.25 mole) of N-o-tolyl formimidate (made in a manner analogous to Example 1) was added dropwise with the temperature increasing in the flask to 82° C. Addition time of the formimidate 10 minutes. Ethyl bromide reflux was noted when the addition of the formimidate was about one-half complete. When the addition of the formimidate was about 90% complete the reaction mixture became milky in appearance. After the completion of the formimidate addition the reaction mixture was refluxed for 15 minutes at 80–90% C. Then 75 ml. of toluene was added to the reaction mixture and the clear liquid which resulted was placed in a deep freeze where it quickly crystallized. The sandy, white crystals were filtered from the suspending liquid and the crystals were washed with 100 ml. of hexane. The resulting air-dried product crystals were a light buff solid, M.P. 87–88° C., and weighing 59 g. An elemental analysis of the product yielded the following results:

Calc'd for $C_{10}H_{10}BrNO_2$ (percent): C, 46.9; H, 3.9; Br, 31.2. Found (percent): C, 47.2; H, 4.1; Br, 31.1.

EXAMPLE 5

This example describes the preparation of 2-chloro-N-formyl-2′-methylacetanilide. The experiment of this example was carried out in a similar manner to Example 4, except that rather than bromoacetyl bromide 30 g. of chloroacetyl chloride was used. The reaction mixture in this instance was also milky prior to the addition of the toluene. The reaction mixture crystallized quickly in the deep freeze yielding sandy, white crystals. The crystalline product was separated by filtration from the suspending liquid, was washed with hexane and air-dried. The product weighed 47 g. and had a melting point of 102.5–103° C. An elemental analysis of this product yielded the following results:

Calc'd for $C_{10}H_{10}ClNO_2$ (percent): C, 56.7; H, 4.8; Cl, 16.8. Found (percent): C, 56.9; H, 5.1; Cl, 16.9.

EXAMPLE 6

This example describes the preparation of 2-bromo-2′-tert-butyl-6′-ethyl-N-formylacetanilide. Similar apparatus was used in this experiment as was used in Example 2. To the flask was added 122 g. (0.6 mole) of bromoacetyl bromide and 200 g. of n-heptane. This mixture was heated to 50° C. and with stirring 128 g. (0.55 mole) of ethyl N-(2-tert-butyl-6-ethylphenyl)formimidate, prepared in an analogous fashion to Example 1, was added to the flask over a period of about 15 minutes. An exothermic reaction occurred with the temperature of the reaction mixture rising to 80° C. The reaction mixture became a light straw color. After the addition of the formimidate gentle refluxing was carried out for one-half hour. Then the reaction mixture was poured into a beaker where it began to crystallize. The beaker and contents were cooled to about 0° C., the crystalline product was filtered from its suspending liquid and the crystalline product was washed twice with hexane. The product was then air-dried and it was noted that there were some yellow spots in the cake, M.P. 77–80° C., and the filter cake was somewhat sticky. The weight of this impure product was 139 g. It was dissolved in 200 ml. of hot methanol, cooled to 10° C., the solid separated by filtration from the methanol and the solid washed with 0° C. methanol. This recrystallized product, after air drying, consisted of white small crystals having a melting point of 77.5–79° C. A second crop of crystals precipitated from the filtrate upon partial evaporation of the filtrate but this second crop of crystals was not isolated. Weight of the crystalline product recovered was 103 g. An elemental analysis of this product yielded the following results:

Calc'd for $C_{15}H_{20}BrNO_2$ (percent): C, 55.2; H, 6.2; Br, 24.5. Found (percent): C, 55.3; H, 6.3; Br, 24.4.

EXAMPLE 7

This example described the preparation of 2'-tert-butyl-2-chloro-6'-ethyl-N-formylacetanilide. This experiment was carried out in a similar manner and in similar equipment to Example 6. 60 g. of chloroacetyl chloride and 200 g. of n-heptane were heated in the flask to 85° C. To this flask with stirring was added 116.7 g. (0.5 mole) of ethyl N-(2-tert-butyl-6-ethylphenyl)formimidate, prepared in a similar manner to the formimidate of Example 1. The formimidate was added from the dropping funnel over a period of 20 minutes and during this time the temperature dropped slightly, due to ethyl chloride reflux. After the addition of the formimidate was completed the reaction mixture was refluxed gently at about 80–90° C. for 15 minutes. The reaction mixture was now transferred to a beaker where crystallization began. The beaker was placed in the refrigerator overnight. The next morning the reaction mixture in the beaker was filtered to remove the crystalline product and the crystalline product was air dried. The product yield was 109 g., M.P. 93–95° C. The crystalline product appeared slightly sticky so was recrystallized from 200 ml. of hot methanol. After cooling the methanol solution to 10° C. with resultant crystallization of the product, the crystals were separated by filtration and were washed with 0° C. methanol. The air-dried recrystallized product consisted of colorless crystals, M.P. 94–95° C., weight—100 g. A second crop of crystals came out as the filtrate evaporated but this second crop of crystals was not isolated. An elemental analysis of the crystalline product yielded the following results:

Calc'd for $C_{15}H_{20}ClNO_2$ (percent): C, 63.9; H, 7.1; Cl, 12.6. Found (percent): C, 64.0; H, 7.2; Cl, 12.4.

EXAMPLE 8

This example describes the preparation of 2-bromo-2'-tert-butyl-N-formylacetanilide. This example was carried out in a manner similar to the other examples. To the flask was added 103 g. (0.55 mole) of bromoacetyl chloride and 200 g. of n-heptane. The flask and contents were heated to 80° C. at which time the addition from the dropping funnel was begun of 102.7 g. (0.5 mole) of ethyl N-(2-tert-butylphenyl)-formimidate, prepared in a manner similar to Example 1, and 35 g. of n-heptane. The addition of the formimidate and heptane was completed in 15 minutes. The reaction mixture was then gently heated and refluxed for a period of one-half hour and the reaction mixture turned dark amber. Refluxing was at a temperature between 80 and 90° C. The reaction mixture was transferred to a beaker, allowed to stand until crystallization began, was chilled to 10° C., and was filtered to remove the crystalline product. The crystalline product was washed twice with 100 ml. portions of hexane and was air dried to yield 122 g. of sandy solid, M.P. 72–73° C. An elemental analysis of this product yielded the following results:

Calc'd for $C_{13}H_{16}BrNO_2$ (percent): C, 52.4; H, 5.4; Br, 26.8. Found (percent): C, __; H, __; Br, 28.1.

EXAMPLE 9

This example describes the preparation of 2'-tert-butyl-2-chloro-N-formylacetanilide. This experiment was carried out in a similar manner and in similar equipment to the previous examples. To the flask was added 60 g. of chloroacetyl chloride and 200 g. of n-heptane. The flask and contents were heated to 90° C. and the dropwise addition was begun of 102.7 g. (0.5 mole) of ethyl N-(2-tert-butylphenyl)formimidate, made in a similar manner to Example 1, and the completion of the addition of the formimidate occurred in 10 minutes. The reation mixture was refluxed with stirring for a period of one-half hour. The reaction mixture was then poured into a beaker and when crystallization began the reaction mixture was cooled to 10° C. in a deep freeze. The crystalline product was filtered from the suspending liquid. The crystals were washed with two 100 ml. portions of hexane and the crystals were air dried. A white, sandy colored crystalline product resulted, M.P. 82.5–83.5° C., weight 108 g. An elemental analysis of this product yielded the following results:

Calc'd for $C_{13}H_{16}ClNO_2$ (percent): C, 61.5; H, 6.4; Cl, 14.0. Found (percent): C, 61.3; H, 6.5; Cl, 14.0.

EXAMPLE 10

This example describes the preparation of 2'-tert-butyl-N-formyl-2-iodo-6'-methylacetanilide. This example was carried out in similar equipment and in a similar manner to the other examples. To the flask was added 50 g. (0.24 mole) of iodoacetyl chloride and 100 g. of heptane. The flask and contents were heated to 45° C. with stirring and the dropwise addition was begun of 48.2 g. (0.22 mole) of ethyl N-(2-tert-butyl-6-methylphenyl)formimidate, prepared in a similar manner to Example 1, in 50 ml. of heptane. The addition of the formimidate was completed in 10 minutes with the temperature rising exothermically in the flask to 65° C. The reaction mixture was heated for an additional one-half hour at 80° C. The reaction mixture was then placed in a beaker in a deep freeze where a crop of dark-colored crystals separated. The solvent was decanted and the solid remaining was slurried with 150 ml. of heptane. The reaction mixture was put in the deep freeze and the next morning the solvent was poured off leaving a brown crystalline product. The crystals were taken up in 150 ml. of methanol at 35° C. and the solution was cut back with water to turbidity. This mixture was then placed in the deep freeze. After the mass had cooled to about 0° C. it was filtered to remove the crystalline product which was washed with 50% methanol. The solid, looking like brown sugar, was taken up in 150 ml. of hot methanol which was cut back with 25 ml. of water and returned to the deep freeze. A crystalline product separated which was removed by filtration, the crystals were washed with 80% methanol, and air dried. Yield of product was 42 g., M.P. 86–89° C. of tan solid. An elemental analysis of this product yielded the following results:

Calc'd for $C_{14}H_{18}INO_2$ (percent): C, 46.8; H, 5.1; I, 35.3. Found (percent): C, 49.7; H, 5.5; I, 36.6.

It was decided to further purify the product so the product was placed in a liter flask with 5 g. of activated carbon and 150 ml. of toluene. The contents of the flask were stirred at 80–90° C. for one-half hour. The activated carbon was separated from the solution of the product by filtration. By this treatment the color of the filtrate was greatly improved. The filtrate was transferred to a beaker and placed in a deep freeze. At first a little contamintaing material separated out. This was filtered off. The filtrate was then warmed to about 50° C. and cut back with 300 ml. of hexane. The reaction mixture was returned to the deep freeze and when it had cooled to about −5° C. a white solid precipitate had separated out. This precipitate was separated by filtration, the precipitate washed with hexane, and air dried. The product had a melting point of 88–95° C. This product was recrystallized from hot absolute methanol. The filtered product from the methanol crystallization was washed with cold methanol and a cream-colored product weighing 32 g. and having a melting point of 88–90° C. resulted. An elemental analysis of this product yielded the following results:

Percent carbon _____ 48.8
Percent hydrogen _____ 5.5
Percent iodine _____ 36.5

EXAMPLE 11

This example describes the preparation of 2-bromo-2'-tert-butyl-N-formyl-6'-isopropylacetanilide. This example was carried out in a similar manner and in similar equipment as the other examples. To the flask was added 55 g. of bromoacetyl bromide and 150 g. of heptane and these were heated to 80° C. Then the dropwise addition was begun of 62 g. (0.25 mole) of ethyl N-(2-tert-butyl-6-isopropylphenyl)formimidate, prepared in a similar manner to Example 1, and the addition was completed in about 10 minutes. Maximum temperature reached in the flask during the formimidate addition was 90° C. with the temperature dropping off somewhat due to ethyl bromide reflux down to 80° C. After the completion of the formimidate addition the reaction mixture was refluxed for 15 minutes at 85–87° C. The reaction mixture was then poured into a beaker and placed in a deep freeze. Crystallization occurred in the beaker and the liquid was poured off from the solid product. The solid product was dissolved in 150 ml. of methanol and recrystallized therefrom, after thoroughly chilling in a deep freeze. The product was separated from the methanol by filtration, was washed with a little very cold methanol and air dried. A white sandy crystalline product, M.P. 88–90° C., and weighing 34 g. resulted. An elemental analysis of this product yielded the following results:

Calc'd for $C_{16}H_{22}BrNO_2$ (percent): C, 57.5; H, 4.8; Br, 23.9. Found (percent): C, 56.7; H, 6.3; Br, 23.3.

EXAMPLE 12

This example describes the preparation of 2'-tert-butyl-2-chloro-5',6'-dimethyl-N-formylacetanilide. This example was carried out in similar equipment but in a somewhat modified fashion to previous examples. To the flask was added 46.7 g. (0.2 mole) of ethyl N-(2-tert-butyl-5,6-dimethylphenyl)formimidate, prepared in a similar manner to Example 1, and 200 ml. of hexane. In a single portion 25 g. of chloroacetyl chloride was added to the flask. No reaction was observed except that the solution became light amber colored. Within ten minutes the color had changed to pink and the temperature had risen to about 40° C. After one-half hour, crystallization began. The reaction mixture was allowed to stand overnight at room temperature. The next day the crystalline product was filtered from the reaction mixture, the crystals washed with hexane and air dried. The resulting product was 50 g., M.P. 110–111° C., of slightly pink needles. A small amount of solid, possibly 5 g., remained in the filter flask on evaporation of the filtrate. An elemental analysis of the 50 g. product yielded the following results:

Calc'd for $C_{15}H_{20}ClNO_2$ (percent): C, 63.9; H, 7.1; Cl, 12.6. Found (percent): C, 64.0; H, 7.4; Cl, 12.5.

If in the experiment of Example 12 instead of ethyl-N-(2-tert-butyl-5,6-dimethylphenyl)formimidate, there is used an equimolar amount of ethyl N-(2,3,5,6-tetramethyl)formimidate or ethyl N-(pentamethylphenyl)formimidate, the resultant products, respectively are: 2',3',5',6'-tetramethyl-2-chloro-N-formylacetanilide and 2',3',4',5',6'-pentamethyl-2-chloro-N-formylacetanilide.

EXAMPLE 13

This example describes the preparation of 2-bromo-2'-tert-butyl-5',6'-dimethyl-N-formylacetanilide. This example was carried out in a similar manner to Example 12. To a 500 ml. Erlenmeyer flask was added 46.7 g. (0.2 mole) of ethyl N-(2-tert-butyl-5,6-dimethylphenyl)formimidate, prepared in a similar manner to Example 1, and 200 ml. of hexane. A single portion of 45 g. of bromoacetyl bromide was added rapidly to this flask and the flask was swirled to facilitate mixing of the reactants. The reaction mixture instantly turned straw-colored and an exothermic reaction occurred raising the temperature of the reaction mixture to 45° C. The color of the reaction mixture then changed to a pale rose color. The reaction mixture was allowed to stand 18 hours at room temperature, during which time crystallization occurred. The crystalline product was filtered from the reaction mixture without chilling, the crystals were washed with hexane and air dried. The product weighing 62 g. had a melting point of 83–84° C. and the crystals were pale pink in color. An elemental analysis of this product yielded the following results:

Calc'd for $C_{15}H_{20}BrNO_2$ (percent): C, 55.2; H, 6.2; Br, 24.5. Found (percent): C, 55.5; H, 6.4; Br, 25.4.

EXAMPLE 14

This example describes the preparation of 2-bromo-2'-chloro-N-formyl-6'-tert-pentylacetanilide. This example is carried out in a similar manner and in similar equipment to Example 13. To the flask was added 63 g. (0.208 mole) of ethyl N-(2-chloro-6-tert-pentylphenyl)formimidate, prepared in a manner similar to Example 1, and 125 g. of heptane. To this solution was added 45 g. of bromoacetyl bromide. The reaction mixture turned yellow and immediately an exothermic reaction occurred. After one minute the temperature was about 60° C. On standing the yellow-colored reaction mixture changed to pink and crystallization occurred. The reaction mixture was allowed to stand overnight in a refrigerator and the next morning the crystalline product was separated by filtration from the reaction mixture. The crystalline product was washed with hexane and air dried, yielding a pale pink solid product, M.P. 108–109° C., weighing 75 g. When the filtrate was evaporated a pink syrup remained. A sample of the 75 g. product was analyzed for chlorine and bromine equivalent to give 1.987.

EXAMPLE 15

This example describes the preparation of 2,2'-dichloro-N-formyl-6'-tert-pentylacetanilide. This example was carried out in a similar manner and in similar equipment to Example 14. 25.4 g. of ethyl N-(2-chloro-6-tert-pentylphenyl)formimidate, prepared in a similar manner to Example 1, and 75 g. of heptane. To the resulting solution in the flask was added 13 g. of chloroacetyl chloride. There was no indication of reaction and the reaction mixture was heated to about 65° C. for one hour, then chilled. Crystallization took place. The flask was cooled overnight in the refrigerator and the next morning the crystalline product was separated by filtration. The separated white, thick, flaky crystals were washed with hexane and air dried to yield 17.9 g. of product having a melting point of 112–113° C. A chlorine analysis of the product yielded 23.6% chlorine.

EXAMPLE 16

This example describes the preparation of 2-bromo-2'-tert-butyl-6'-chloro-N-formylacetanilide. This example was carried out in similar equipment and in a similar manner as the previous example. To a flask was added 24 g. (0.1 mole) of ethyl N-(2-tert-butyl-6-chlorophenyl)formimidate, prepared in a similar manner to Example 1, and 70 g. of heptane. To the resulting solution 22 g. of bromoacetyl bromide was added in a single slug. After a few seconds an exothermic reaction occurred increasing the temperature of the reaction mixture to 40° C. On cooling the reaction mixture product crystallized therefrom. The well formed crystals were filtered off, washed with hexane and air dried. The filtrate was almost colorless. The crystalline product weighed 28.5 g. and had a melting point of 92–93° C. An elemental analysis gave a bromine and chlorine equivalent of 2.03.

EXAMPLE 17

This example describes the preparation of 2'-tert-butyl-2,6'-dichloro-N-formylacetanilide. This example was prepared in a similar manner to the previous example. To the flask was added 24 g. of ethyl N-(2-tert-butyl-6-chlorophenyl)formimidate, prepared in a similar manner to Example 1, and 70 g. of heptane. To the resulting solution in the flask was added 13 g. (excess) chloroacetyl chloride. At the end of 15 minutes there was no evidence of reaction so the reaction mixture was heated to 70° C. for one-half hour and allowed to stand overnight. The next morning nicely formed white crystals were noted in the flask and these were removed from the reaction mixture by filtration. The crystals were washed with hexane and air dried, yielding 19 g. of crystalline product having a melting point of 109–110° C. A chlorine analysis of this product yielded the following results: 24.7% chlorine. Calculated for $C_{13}H_{15}Cl_2NO_2$, Cl=24.6.

If in the experiment of Example 17 instead of ethyl N - (2 - chloro-6-tert-butylphenyl)formimidate, there is used an equimolar amount of ethyl N-(2-bromo-6-tert-butylphenyl)formimidate, ethyl N - (2 - iodo-6-tert-butylphenyl)formimidate or ethyl N-(2-fluoro-6-butylphenyl)formimidate, the resultant products are as follows, respectively: 2'-tert-butyl-2-chloro-6'-bromo - N - formyl-acetanilide, 2' - tert-butyl-2-chloro-6'-iodo-N-formylacetanilide, and 2'-tert-butyl-2-chloro-6'-fluoro-N-formylacetanilide.

EXAMPLE 18

This example describes the preparation of 2-bromo-2'-tert - butyl-5'-chloro-N-formyl-6'-methylacetanilide. This example was carried out in a similar manner to the previous example. To the flask was added 51 g. (0.2 mole) of ethyl N - (2-tert-butyl-5-chloro-6-methylphenyl)formimidate, prepared in a similar manner to Example 1, and 150 g. of heptane. To the resulting solution in the flask was added 50 g. of bromoacetyl bromide and an exothermic reaction began, increasing the temperature of the reaction mixture to 40° C. On cooling of the reaction mixture overnight a heavy oil had separated. This oil solidified in the deep freeze. The solvent was poured off the oil and the solid product remaining was crystallized from a 5:1 heptane/toluene mixture. The crystallized product separated by filtration was washed with hexane and air dried yielding 56 g. of product having a melting point of 85–86° C. An elemental analysis of the product yielded the following results:

Calc'd. for $C_{14}H_{17}BrClNO_2$ (percent): C, 48.5; H, 4.9; Br and Cl, equivalent of 1.9968, 2.0. Found (percent): C, 48.6; H, 5.0.

EXAMPLE 19

This example describes the preparation of 2'-tert-butyl-2,5'-dichloro-N-formyl-6'-methylacetanilide. This example was carried out in a similar manner to the previous example. To the flask was added 51 g. (0.2 mole) of ethyl N - (2-tert-butyl-5-chloro-6-methylphenyl)formimidate and 150 g. of heptane. To the resulting solution in the flask was added 30 g. of chloroacetyl chloride. There was no indication of exothermic reaction after 15 minutes. The reaction mixture was then heated for one hour at 65° C. Then the reaction mixture was placed in a deep freeze where crystallization took place. The solvent was poured off the solid product and the solid product was taken up in heptane. The heptane solution of the product was seeded with crystals of the product and placed in the deep freeze again. Crystallization occurred and the crystals were separated by filtration, washed with hexane and air dried. The resulting product was sandy, white in color, M.P. 70–77° C., and weight 43 g. This product was recrystallized from methanol and then had a melting point of 70–71° C. with 37 g. of this methanol-recrystallized product being recovered. An elemental analysis of the purified product yielded the following results:

Calc'd. for $C_{14}H_{17}Cl_2NO_2$ (percent): C, 55.6; H, 5.7; Cl, 23.5. Found (percent): C, 55.6; H, 5.7; Cl, 23.4.

EXAMPLE 20

This example describes the preparation of 2'-tert-butyl-2,2-dichloro-N-formyl-6'-methylacetanilide. This example was carried out in a similar manner to other examples. To the flask were added 43.8 g. (0.2 mole) of ethyl N-(2-tert-butyl-6-methylphenyl)formimidate and 200 ml. of hexane. Then 31 g. (0.21 mole) of dichloroacetyl chloride was added as a single amount to the flask. A slight exothermic reaction was evident after a slight delay, the temperature rising in the flask to about 40° C. The reaction mixture was allowed to stand overnight. No crystallization had taken place, and the reaction mixture was placed in a deep freeze where crystallization took place. The crude crystalline product was separated by filtration from the reaction mixture, and the product was recrystallized from 80% methanol. The recrystallized product consisted of sandy, slightly pinkish crystals, weight 38 g., M.P. 65–66° C. An additional amount of crude product was recovered upon evaporation of the filtrate, but this crude product was discarded. An elemental analysis of the 38 g. product yielded 23.4% chlorine. Calculated for $C_{14}H_{17}Cl_2NO_2$, Cl=23.5.

If in the experiment of Example 20 instead of dichloroacetyl chloride, there is used an equimolar amount of dibromoacetyl chloride, iodochloroacetyl chloride, or fluorochloroacetyl chloride, the resultant products are respectively:

2'-tert-butyl-2,2-dibromo-N-formyl-6'-methyl-acetanilide,
2'-tert-butyl-2-iodo-2-chloro-N-formyl-6'-methyl-acetanilide and
2'-tert-butyl-2-fluoro-2-chloro-N-formyl-6'-methyl-acetanilide.

EXAMPLE 21

In this example, the pre-emergence herbicidal ratings of some of the N-formyl α-haloacetanilides of this invention were determined in greenhouse tests in which a specific number of seeds of a number of different plants, each representing a principal botanical type, were planted in greenhouse flats.

A good grade of top soil was placed in aluminum pans and compacted to a depth of ⅜ to ½ inch from the top of the pan. On the top of the soil were placed a pre-determined number of seeds of each of the following plant species. Morning glory, wild oat, brome grass, rye grass, radish, sugar beet, giant foxtail, crabgrass, pigweed, soybean, wild buckwheat, tomato, sorghum. In some tests seeds of cotton, corn, barnyard grass and rice were also added. In the surface applications the seeds were covered by over-filling the pan with soil and striking it level. The measured amount of chemical in a suitable solvent or as a wettable powder was applied to this surface. In the soil incorporation treatments the soil required to level fill the pans after seeding was weighed into a pan, a known amount of the chemical applied in a solvent or as a wettable powder, the soil thoroughly mixed and used as a cover layer for seeded pans. After treatment the pans were moved into a greenhouse bench where they were watered from below as needed to give adequate moisture for germination and growth.

Approximately 14 days after seeding and treating the plants were observed and the results recorded by counting. The herbicidal rating was obtained by means of a fixed scale based on the average percent germination of each seed lot. The herbicidal ratings are defined as follows:

0—No phytotoxicity
1—Slight phytotoxicity
2—Moderate phytotoxicity
3—Severe phytotoxicity.

The pre-emergence herbicidal activity of some of the N-formyl α-haloacetanilides of this invention are recorded in Table I for various application rates of the N-formyl α-haloacetanilide in both surface and soil-incorporated applications. In Table I, the various seeds are represented by letters as follows:

A—General grass
B—General broadleaf
C—Morning Glory
D—Wild oats
E—Brome grass
F—Rye grass
G—Radish
H—Sugar beet
I—Cotton
J—Corn
K—Foxtail
L—Barnyard
M—Crab grass
N—Pigweed
O—Soybean
P—Wild buckwheat
Q—Tomato
R—Sorghum
S—Rice.

Individual injury ratings for each plant type are reported in Table I. In addition, the total injury rating for all grass plants and the total injury rating for all broadleaf plants are also reported in Table I.

The data in Table I illustrate the outstanding general and selective herbicidal activity of some of the N-formyl α-haloacetanilides of this invention

TABLE I.—PRE-EMERGENCE HERBICIDAL ACTIVITY

| Ex. No. | Compound | Rate, lb./acre | A | B | C | D | E | F | G | H | I | J | K | L | M | N | O | P | Q | R | S | Grass | Broad-leaf | Comments |
|---|---|---|---|---|---|---|---|---|---|---|---|---|---|---|---|---|---|---|---|---|---|---|---|---|
| 2 | 2-bromo-2'-tert-butyl N-formyl-6'-methyl acetanilide | 5 | 3 | 1 | 0 | 2 | 2 | 3 | 2 | 2 | | | 3 | | 3 | 3 | 0 | 0 | 0 | 3 | | 16 | 7 | (1) |
| | | 1 | 2 | 0 | 0 | 1 | 0 | 3 | 0 | 0 | 0 | 0 | 3 | 3 | 3 | 3 | 0 | 0 | 0 | 3 | 1 | 17 | 3 | (2) |
| | | ¼ | 2 | 0 | 0 | 1 | 1 | 0 | 0 | 0 | 0 | 0 | 3 | 3 | 3 | 1 | 0 | 0 | 0 | 1 | 0 | 12 | 1 | (2) |
| 3 | 2'-tert-butyl-2-chloro-N-formyl-6'-methylacetanilide | 5 | 3 | 1 | 2 | 3 | 2 | 3 | 1 | 2 | | | 3 | | 3 | 3 | 0 | 0 | 1 | 3 | | 17 | 9 | (1) |
| | | 1 | 3 | 2 | 3 | 3 | 3 | 3 | 0 | 1 | 0 | 3 | 3 | 3 | 3 | 3 | 1 | 2 | 3 | 3 | 3 | 27 | 13 | (2) |
| | | ¼ | 3 | 0 | 1 | 2 | 2 | 3 | 0 | 0 | 0 | 1 | 3 | 3 | 3 | 2 | 1 | 0 | 0 | 3 | 1 | 21 | 4 | (2) |
| | | 0.05 | 2 | 0 | 0 | 0 | 1 | 2 | 0 | 0 | 0 | 0 | 3 | 3 | 2 | 0 | 0 | 0 | 0 | 2 | 0 | 13 | 0 | (2) |
| 4 | 2-bromo-N-formyl-2'-methylacetanilide | 5 | 2 | 1 | 0 | 1 | 2 | 2 | 1 | 2 | | | 3 | | 2 | 3 | 1 | 0 | 0 | 1 | | 11 | 7 | (1) |
| 5 | 2-chloro-N-formyl-2'-methylacetanilide | 5 | 3 | 1 | 2 | 2 | 2 | 3 | 0 | 2 | | | 3 | | 3 | 3 | 1 | 0 | 1 | 2 | | 15 | 9 | (1) |
| 6 | 2-bromo-2'-tert-butyl 6'-ethyl-N-formylacetanilide | 5 | 3 | 3 | 3 | 3 | 3 | 3 | 1 | 3 | | | 3 | | 3 | 3 | 2 | 3 | 3 | 3 | | 18 | 18 | (1) |
| | | 1 | 3 | 0 | 1 | 3 | 2 | 2 | 0 | 0 | 0 | 0 | 3 | 3 | 3 | 2 | 0 | 0 | 0 | 3 | 3 | 22 | 3 | (2) |
| | | ¼ | 1 | 0 | 0 | 0 | 0 | 0 | 0 | 0 | 0 | 0 | 3 | 3 | 3 | 2 | 0 | 0 | 0 | 3 | 0 | 11 | 2 | (2) |
| 7 | 2'-tert-butyl-2-chloro-6'-ethyl-N-formylacetanilide | 5 | 3 | 3 | 2 | 3 | 3 | 3 | 1 | 3 | | | 3 | | 3 | 3 | 2 | 1 | 3 | 3 | | 18 | 15 | (1) |
| | | 1 | 3 | 1 | 1 | 3 | 3 | 3 | 1 | 1 | 0 | 1 | 3 | 3 | 3 | 3 | 0 | 0 | 1 | 3 | 3 | 25 | 7 | (2) |
| | | ¼ | 3 | 0 | 0 | 1 | 3 | 3 | 0 | 0 | 0 | 0 | 3 | 3 | 3 | 2 | 0 | 0 | 1 | 3 | 0 | 19 | 3 | (2) |
| | | 0.05 | 1 | 0 | 0 | 0 | 0 | 0 | 0 | 0 | 0 | 0 | 3 | 3 | 3 | 0 | 0 | 0 | 0 | 2 | 0 | 11 | 0 | (2) |
| 8 | 2-bromo-2'-tert-butyl-N-formylacetanilide | 5 | 3 | 1 | 2 | 3 | 3 | 3 | 0 | 2 | | | 3 | | 3 | 3 | 1 | 0 | 1 | 3 | | 18 | 9 | (1) |
| | | 1 | 2 | 0 | 0 | 0 | 1 | 1 | 0 | 0 | 2 | 0 | 3 | 2 | 3 | 0 | 0 | 0 | 0 | 0 | 2 | 12 | 2 | (2) |
| 9 | 2'-tert-butyl-2-chloro-N-formylacetanilide | 5 | 3 | 2 | 2 | 3 | 3 | 3 | 2 | 2 | | | 3 | | 3 | 3 | 0 | 1 | 1 | 3 | | 18 | 11 | (1) |
| | | 1 | 2 | 0 | 0 | 0 | 3 | 3 | 0 | 0 | 1 | 0 | 3 | 3 | 3 | 1 | 1 | 0 | 0 | 1 | 0 | 16 | 3 | (2) |
| | | ¼ | 1 | 0 | 0 | 0 | 3 | 1 | 0 | 0 | 2 | 0 | 3 | 1 | 3 | 0 | 0 | 0 | 0 | 0 | 0 | 11 | 2 | (2) |
| 10 | 2'-tert-butyl-N-formyl-2-iodo-6'-methylacetanilide | 5 | 3 | 3 | 2 | 3 | 2 | 3 | 2 | 2 | | | 3 | | 3 | 3 | 3 | 1 | 2 | 3 | | 17 | 15 | (1) |
| | | 1 | 3 | 0 | 0 | 1 | 3 | 3 | 0 | 0 | 0 | 0 | 3 | 3 | 3 | 3 | 0 | 0 | 0 | 3 | 1 | 20 | 3 | (2) |
| | | ¼ | 3 | 0 | 0 | 1 | 3 | 3 | 0 | 0 | 1 | 0 | 3 | 3 | 3 | 2 | 0 | 0 | 0 | 3 | 0 | 19 | 3 | (2) |
| 11 | 2-bromo-2'-tert-butyl-N-formyl-6'-isopropyl-acetanilide | 5 | 3 | 1 | 1 | 3 | 3 | 3 | 0 | 2 | | | 3 | | 3 | 3 | 0 | 1 | 1 | 3 | | 18 | 8 | (1) |
| | | 1 | 2 | 0 | 1 | 2 | 2 | 1 | 0 | 0 | 1 | 0 | 3 | 3 | 3 | 2 | 0 | 0 | 0 | 3 | 0 | 17 | 4 | (2) |
| | | ¼ | 2 | 0 | 0 | 1 | 2 | 1 | 0 | 0 | 0 | 0 | 3 | 3 | 3 | 1 | 0 | 0 | 0 | 2 | 1 | 16 | 1 | (2) |
| 12 | 2'-tert-butyl-2-chloro-5',6'-dimethyl-N-formyl-acetanilide | 5 | 3 | 2 | 2 | 2 | 2 | 3 | 2 | 2 | | | 3 | | 3 | 3 | 0 | 1 | 2 | 3 | | 15 | 13 | (1) |
| | | 1 | 3 | 2 | 2 | 3 | 3 | 3 | 2 | 1 | 0 | 3 | 3 | 3 | 3 | 2 | 0 | 1 | 3 | 3 | 2 | 26 | 11 | (2) |
| | | ¼ | 3 | 0 | 0 | 2 | 3 | 3 | 0 | 0 | 0 | 1 | 3 | 3 | 3 | 0 | 0 | 2 | 3 | 0 | 2 | 21 | 5 | (2) |
| | | 0.05 | 2 | 0 | 0 | 0 | 0 | 2 | 0 | 0 | 0 | 0 | 3 | 3 | 3 | 1 | 0 | 0 | 0 | 0 | 1 | 12 | 1 | (2) |
| 13 | 2-bromo-2'-tert-butyl-5',6'-dimethyl-N-formyl-acetanilide | 5 | 3 | 3 | 3 | 3 | 3 | 3 | 3 | | | | 3 | | 3 | 3 | 2 | 2 | 3 | 3 | | 18 | 19 | (1) |
| | | 1 | 3 | 0 | 3 | 2 | 3 | 3 | 0 | 0 | 2 | 3 | 3 | 3 | 3 | 1 | 0 | 0 | 0 | 3 | 2 | 24 | 4 | (2) |
| | | ¼ | 3 | 0 | 1 | 1 | 3 | 3 | 0 | 0 | 1 | 3 | 3 | 3 | 3 | 1 | 0 | 0 | 0 | 3 | 1 | 21 | 2 | (2) |
| | | 0.05 | 2 | 0 | | 0 | 1 | 3 | 0 | 0 | 0 | 0 | 3 | 3 | 2 | 2 | 0 | 0 | 0 | 2 | 1 | 12 | 2 | (2) |
| 14 | 2-bromo-2'-chloro-N-formyl-6'-tert-pentyl-acetanilide | 5 | 2 | 1 | 1 | 1 | 1 | 1 | 0 | 1 | | | 3 | | 3 | 3 | 0 | 1 | 0 | 2 | | 11 | 6 | (1) |
| | | 1 | 3 | 0 | 0 | 3 | 3 | 3 | 0 | 0 | 0 | 1 | 3 | 3 | 3 | 2 | 1 | 0 | 0 | 3 | 2 | 24 | 3 | (2) |
| | | ½ | 2 | 0 | 0 | 2 | 2 | 3 | 0 | 0 | 0 | 0 | 2 | 3 | 3 | 1 | 0 | 0 | 0 | 1 | 2 | 18 | 1 | (2) |
| 15 | 2,2'-dichloro-N-formyl-6'-tert-pentylacetanilide | 5 | 1 | 1 | 2 | 0 | 0 | 1 | 0 | 0 | | | 3 | | 3 | 3 | 1 | 0 | 0 | 1 | | 8 | 6 | (1) |
| | | 1 | 3 | 1 | 2 | 3 | 3 | 3 | 2 | 1 | 0 | 2 | 3 | 3 | 3 | 3 | 0 | 0 | 1 | 3 | 3 | 26 | 9 | (2) |
| | | ¼ | 3 | 0 | 0 | 3 | 3 | 3 | 0 | 0 | 0 | 2 | 3 | 3 | 3 | 3 | 0 | 0 | 0 | 3 | 3 | 26 | 3 | (2) |
| 16 | 2-bromo-2'-tert-butyl-6'-chloro-N-formylacetanilide | 5 | 3 | 2 | 3 | 3 | 2 | 3 | 2 | 2 | | | 3 | | 3 | 3 | 0 | 1 | 1 | 3 | | 17 | 12 | (1) |
| | | 1 | 3 | 0 | 0 | 3 | 3 | 3 | 1 | 0 | 0 | 0 | 3 | 3 | 3 | 3 | 0 | 0 | 0 | 3 | 1 | 22 | 3 | (2) |
| | | ¼ | 3 | 0 | | 3 | 1 | 3 | 1 | 0 | 0 | 0 | 3 | 3 | 3 | 1 | 0 | 0 | 0 | 2 | 1 | 19 | 2 | (2) |
| 17 | 2'-tert-butyl-2,6'-dichloro-N-formylacetanilide | 5 | 3 | 1 | 2 | 2 | 2 | 1 | 0 | 1 | | | 3 | | 3 | 3 | 0 | 0 | 3 | 2 | | 13 | 9 | (1) |
| | | 1 | 2 | 0 | 0 | 0 | 2 | 2 | 0 | 0 | 0 | 0 | 3 | 3 | 3 | 2 | 0 | 0 | 0 | 2 | 0 | 15 | 2 | (2) |
| 18 | 2-bromo-2'-tert-butyl-5'-chloro-N-formyl-6'-methylacetanilide | 5 | 2 | 1 | 2 | 2 | 2 | 0 | 1 | 1 | | | 3 | | 3 | 3 | 0 | 0 | 0 | 2 | | 12 | 7 | (1) |
| | | 1 | 3 | 0 | | 3 | 3 | 3 | 0 | 0 | 0 | 0 | 3 | 3 | 3 | 2 | 0 | 0 | 0 | 3 | 2 | 23 | 4 | (2) |
| | | ½ | 3 | 3 | 2 | 2 | 1 | 3 | 2 | 1 | | | 3 | | 3 | 3 | 3 | 1 | 3 | 3 | | 14 | 15 | (2) |
| | | ¼ | 2 | 0 | 0 | 0 | 3 | 1 | 0 | 0 | 0 | 0 | 3 | 3 | 3 | 0 | 0 | 0 | 0 | 2 | 1 | 16 | 0 | (2) |
| 19 | 2'-tert-butyl-2,5'-dichloro-N-formyl-6'-methylacetanilide | 5 | 3 | 3 | 3 | 2 | 3 | 3 | 3 | 3 | | | 3 | | 3 | 3 | 0 | 2 | 3 | 3 | | 17 | 17 | (1) |
| | | 1 | 3 | 0 | 0 | 2 | 3 | 3 | 0 | 0 | 0 | 0 | 3 | 3 | 3 | 2 | 0 | 0 | 1 | 2 | 0 | 19 | 3 | (2) |
| | | ½ | 2 | 2 | 1 | 1 | 0 | 2 | 1 | 1 | | | 3 | | 3 | 3 | 3 | 2 | 1 | 3 | | 12 | 12 | (2) |
| | | ¼ | 3 | 0 | 0 | 3 | 3 | 3 | 1 | 2 | 0 | 1 | 3 | 3 | 3 | 0 | 0 | 0 | 2 | 3 | 2 | 24 | 8 | (2) |
| 20 | 2'-tert-butyl-2,2-dichloro-N-formyl-6'-methylacetanilide | 5 | 3 | 1 | 0 | 0 | 3 | 2 | 0 | 1 | | | 3 | | 3 | 3 | 0 | 0 | 2 | 2 | | 13 | 6 | (1) |

[1] Surface application.
[2] Incorporation in soil.

EXAMPLE 22

In this example, the contact herbicidal activity of some of the N-formyl α-haloacetanilides of this invention was determined in greenhouse tests. The N-formyl α-haloacetanilide to be tested was applied in spray form to plants of a given age of the same grasses and broadleaf plants as used in the pre-emergence tests described in Example 21. The same number of seeds of the same plants used in Example 21 were planted in aluminum pans. After the plants were the desired age, each aluminum pan was sprayed with a given volume of a 0.5% concentration solution of the candidate chemical, corresponding to a rate of approximately 10 lbs. per acre. This herbicidal solution was prepared from an aliquot of a 2% solution of the candidate compound in acetone, a known amount of cyclohexanone-emulsifying agent mix, and sufficient water to make up to volume. The emulsifying agent was a mixture comprising 35 wt. percent butylamine dodecylbenzene sulfonate and 65 wt. percent of a tall oil-ethylene oxide condensate having about 6 moles of ethylene oxide per mole of tall oil. The injuries to the plants were then observed approximately 14 days later and are reported in Table II. The herbicidal ratings recorded in Table II have the same meaning as stated in Example 21, except that the ratings are 0 through 4 with 4 meaning all plants are dead.

TABLE II.—CONTACT HERBICIDAL ACTIVITY OF α-HALOACETANILIDES OF THE INVENTION

| Ex. No. | Compound | General Grass | Broadleaf |
|---|---|---|---|
| 2 | 2-bromo-2'-tert-butyl-N-formyl-6'-methylacetamilide | 1 | 2 |
| 4 | 2-bromo-N-formyl-2'-methylacetanilide | 1 | 4 |
| 5 | 2-chloro-N-formyl-2'-methylacetanilide | 0 | 2 |
| 8 | 2-bromo-2'-tert-butyl-N-formylacetanilide | 0 | 2 |
| 9 | 2'-tert-butyl-2-chloro-N-formylacetanilide | 1 | 2 |

The herbicidal compositions of this invention are either particulate solid (i.e. dusts) or liquid concentrate compositions comprising the active ingredient and either a particultae solid or liquid herbicidal adjuvant which are formulation aids or conditioning agent permitting the concentrate composition to be readily mixed with a suitable solid or liquid carrier in the field for application of the active ingredient on soil or plant surfaces in a toxic concentration in a form which enables prompt assimilation by the germinating seeds, emerging seedlings, or full grown plants. Thus, the herbicidal compositions of this invention include not only the concentrate compositions comprising the active ingredient and the herbicidal adjuvant but also herbicidal toxicant compositions applied in the field comprising the concentrate composition (i.e., active ingredient plus herbicidal adjuvant) and the carrier.

As demonstrated in the examples above, quite different effects can be obtained by modifying the method of use of the herbicidal compositions of this invention. Thus, unusual grass specificity can be achieved at lower levels of application whereas at higher levels of application a more general herbicidal effect or soil sterilization takes place. Therefore, an essential part of this invention is the formulation of the herbicidal composition so as to permit a uniform predetermined application of the composition to the plant environment to produce the desired effect.

Herbicidal adjuvants useful in preparing the concentrate compositions and, therefore, the herbicidal toxicant compositions applied to the soil or plants, include particulate solid or liquid extending agents such as solvents or diluents within which the active ingredient is dissolved or suspended, wetting or emulsifying agents which serve in providing uniform dispersions or solutions of the active ingredient in the extending agents, and adhesive agents or spreading agents which improve the contact of the active ingredient with the soil or plant surfaces. All herbicidal compositions of this invention include at least one of the above types of herbicidal adjuvants and usually include an extending agent and a wetting or emulsifying agent because of the nature of the physical properties of the N-formyl α-haloacetanilides of this invention.

In general, the N-formyl α-haloacetanilides of this invention are more soluble in water and organic solvents than the α-haloacetanilides with the N-formyl group. However, the active ingredient need not be dissolved in the extending agent but may merely be dispersed or suspended in the extending agent as a suspension or emulsion. Also, the N-formyl α-haloacetanilides may first be dissolved in a suitable organic solvent and the organic solution of the active ingredient then incorporated in water or an aqueous extending agent to form a heterogeneous dispersion. Examples of some suitable organic solvents for use as extending agents include hexane, benzene, toluene, acetone, cyclohexanone, methylethylketone, isopropanol, butanediol, methanol, diacetone alcohol, xylene, dioxane, isopropyl ether, ethylene dichloride, tetrachloroethane, hydrogenated naphthalene, solvent naphtha, petroleum fractions (e.g., those boiling almost entirely under 400° F. at atmospheric pressure and having flash points above about 80° F., particularly kerosene), and the like. Where true solutions are desired, mixtures of organic solvents have been found to be useful, for example 1:1 and 1:2 mixtures of xylene and cyclohexanone.

Solid extending agents in the form of particulate solids are very useful in the practice of the present invention. In using this type of extending agent, the active ingredient is either adsorbed or dispersed on or in the finely-divided solid material. Preferably the solid extending agents are not hygroscopic but are materials which render the composition permanently dry and free flowing. Suitable solid extending agents include the natural clays, such as china clays, the bentonites and attapulgites; other minerals in natural state, such as talc, pyrophillite, quartz, diatomaceous earth, Fuller's earth, chalk, rock phosphate, kaolin, kieselguhr, volcanic ash, salt, and sulfur; the chemically modified minerals, such as acid-washed bentonite, precipitated calcium phosphate, precipitated calcium carbonate, calcined magnesia, and colloidal silica; and other solid materials such as powdered cork, powdered wood and powdered pecan or walnut shells. These materials are used in finely-divided form, at least in a size range of 20–40 mesh and preferably in much finer size.

The particulate solid concentrate compositions are applied to the soil by admixture at the time of application with a particulate solid carrier material. If desired, this concentrate composition can also be applied as a wettable powder using a liquid carrier material. When used by this method, a wetting agent or surface active agent is added to the concentrate composition in order to render the particulate solid extending agent wettable by water to obtain a stable aqueous dispersion or suspension suitable for use as a spray. Also the extending agent applied as a wettable powder is used in very finely-divided form, preferably in a size as small as 100 mesh or smaller.

The surface active agent, that is the wetting, emulsifying, or dispersion agent, used in the herbicidal composition of this invention to serve in providing uniform dispersions of all formulation components of both liquid and dust types in both the concentrate compositions and the toxicant compositions applied may be either anionic, cationic, or nonionic types, including mixtures thereof. Suitable surface active agents are the organic surface active agents capable of lowering the surface tension of water and include the conventional soaps, such as the water-soluble salts of long-chain carboxylic acids; the amino soaps, such as the amine salts of long-chain carboxylic acids; the sulfonated animal, vegetable and mineral oils; quaternary salts of high molecular weight acids; rosin soaps, such as salts of abietic acid; sulfuric acid salts of high molecular weight organic compounds; algin soaps, ethylene oxide condensated with fatty acids, alkyl phenols and mercaptans; and other simple and polymeric compositions having both hydrophilic and hydrophobic functions.

The herbicidal concentrate compositions of this invention ordinarily have the active ingredient and the surface active agent present in higher concentrations than the toxicant compositions applied in the field so that upon dilution with the liquid or solid carrier, compositions containing optimum proportions of active ingredient and surface active agent are prepared to obtain uniform distribution and to maintain the active ingredient in a form which enabled the prompt assimilation by the plant.

The liquid concentrate compositions of this invention preferably comprise 5% to 95% by weight of the active ingredient and the remainder the herbicidal adjuvant, which may be solely liquid extending agent or surface active agent (including adhesive agent), but preferably is a combination of liquid extending agent and surface active agent; however, normally it is preferred that the herbicidal adjuvant be the major component in the composition, i.e. be present in the composition in excess of 50% by weight. Preferably the surface active agent comprises from 0.1% to 15% by weight of the total concentrate composition. The remainder of the composition is the liquid extending agent.

Use of the surface active agent is desirable in the formulation of liquid concentrate compositions in order to obtain a composition containing a sufficient concentration of the N-formyl α-haloacetanilide in the liquid extending agent. However, the liquid extending agent should be selected not only on the basis of the amount of the N-formyl-α-haloacetanilide dissolved but also upon the basis of the solution temperature of the total composition. Thus, in some formulations, a particular combination of solvents gives a sufficiently low solvent temperature but the amount of the N-formyl α-haloacetanilide dissolved or dispersed in the mixture is insufficient and a suitable surface active agent must be selected in order that more N-formyl α-haloacetanilide can be dispersed in the composition. Preferably, the concentrate composition has a solution temperature below 0° C. although compositions having solution temperatures as high as 20° C. can be used.

The concentration of N-formyl α-haloacetanilide in the particulate solid or dust concentrate composition of this invention may vary over wide ranges depending upon the nature of the solid extending agent and the intended use of the composition. Since the N-formyl α-haloacetanilides of this invention have very high toxicities and are applied at very low rates in order to obtain selectivity, the concentration of the active ingredient in the dust composition may be very low and may comprise as little as 1% or less by wt. of the total dust composition. By contrast, when the dust composition is to be used for soil sterilization, it may be desirable to have a very high concentration of active ingredient and for such use the active ingredient may comprise as much as 5% to 98% by wt. of the total composition. The remainder of the composition is the herbicidal adjuvant which is usually only the particulate solid extending agent; however, normally it is preferred that the herbicidal adjuvant be the major component in the composition, i.e. be present in the composition in excess of 50% by wt. Thus, the surface active agent is not usually required in dust concentrate compositions although it can be used if desired. However, if the dust concentrate composition is to be applied as a wettable powder, surface active agent must be added to the concentrate composition and ordinarily the amount of the amount of surface active agent will be in the range of 0.1% to 15% by wt. of the composition.

The carrier material, used for the uniform distribution of the N-formyl α-haloacetanilide in an herbicidally effective amount to inhibit the growth of either all or selected plants, may be either a liquid or a particulate solid material. Normally, the carrier material will be the major component in the toxicant compositions as applied, and this means the carrier will constitute more than 50% by weight of the toxicant composition. The liquid and solid extending agents used to prepare the concentrate composition may also be used as the carrier; however, the use of these materials as a carrier is often not economical. Therefore, water is the preferred liquid carrier, both for use with the liquid concentrate composition and the wettable powder concentrate. Suitable particulate solid carriers include the particulate extending agents noted above as well as the solid fertilizers such as ammonium nitrate, urea, and superphosphate, as well as other materials in which plant organisms may take root and grow, such as compost, manure, humus, sand and the like.

The liquid and dust concentrate compositions of this invention can also contain other additaments such as fertilizer and pesticides. Also, these additaments may be used as, or in combination with, the carrier materials.

The herbicidal compositions of this invention are applied to the plant systems in the conventional manner. Thus, the dust and liquid compositions may be applied to the foliage of growing plants by the use of power-dusters, broom and hand sprayers, and spray-dusters. The compositions can also be very suitably applied from airplanes as a dust or a spray because the herbicidal compositions of this invention are effective in a very low dosage. In order to prevent growth of germinating seeds or emerging seedlings, the dust and liquid compositions are applied to the surface of the soil or distributed in the soil to a depth of at least ½ inch below the soil surface, according to conventional methods. The herbicidal compositions of this invention can also be applied by addition to irrigation water supplied to the field to be treated. This method of application permits the penetration of the compositions into the soil as the water is absorbed therein. Dust compositions sprinkled on the surface of the soil can be distributed below the surface of the soil by the usual discing, dragging or mixing operations.

The application of a growth-inhibiting amount or toxic amount of the N-formyl α-haloacetanilide to the plant system is essential in the practice of the present invention. The exact dosage to be applied is dependent not only upon the specific N-formyl α-haloacetanilide but also upon the particular plant species to be controlled and the stage of growth thereof as well as the part of the plant to be contacted with the toxicant. In non-selective foliage treatments, the herbicidal compositions of this invention are usually applied at a rate sufficient to obtain from 5 to 50 lbs. of N-formyl α-haloacetanilide per acre but lower or higher rates may be applied in some cases. In non-selective pre-emergence treatments, these herbicidal compositions are usually applied at a somewhat lower rate than in foliage treatments but at a rate which is ordinarily within the same general range; that is, at a rate in the range of 1 to 25 lbs. per acre. However, because of the unusually high unit activity possessed by the nitrogen-substituted α-haloacetanilides of this invention, soil sterilization is ordinarily accomplished at a rate of application in the range of 1 to 50 lbs. per acre. In selective pre-emergence applications to the soil, a dosage of from 0.05 to 5 lbs. of active ingredient per acre is usually employed but lower or higher rates may be necessary in some instances. It is believed that one skilled in the art can readily determine from this disclosure, including the examples, the optimum rate to be applied in any particular case.

What is claimed is:

1. A compound of the formula

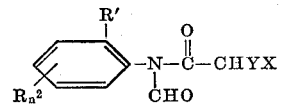

wherein R' is alkyl having not more than 10 carbon atoms; R² is selected from the group consisting of halogen, alkyl having not more than 6 carbon atoms and alkoxy having not more than 4 carbon atoms; $n$ is an integer from 0 to 4; X is selected from the group consisting of chlorine, bromine and iodine; and Y is selected from the group consisting of hydrogen and halogen.

2. A compound of claim 1 wherein Y is the hydrogen atom, $R^1$ is t-alkyl having not more than 5 carbon atoms, $n$ is 1, $R^2$ is alkyl in the ortho position and having not more than 6 carbon atoms, and X is the chlorine atom.

3. A compound of claim 1 wherein Y is the hydrogen atom, $R^1$ is t-alkyl having not more than 5 carbon atoms, $n$ is 2, $R^2$ is the methyl radical positioned in ortho and meta positions, and X is the chlorine atom.

4. A compound of claim 1 wherein Y is the hydrogen atom, $R^1$ is t-alkyl having not more than 5 carbon atoms, $n$ is 1, $R^2$ is the chlorine atom positioned in the ortho position, and X is the chlorine atom.

5. A compound of claim 1 wherein Y is the hydrogen atom, $R^1$ is t-alkyl having not more than 5 carbon atoms, $n$ is 1, $R^2$ is alkyl positioned in the ortho position and having not more than 6 carbon atoms, and X is the bromine atom.

6. A compound of claim 1 wherein Y is the hydrogen atom, $R^1$ is t-alkyl having not more than 5 carbon atoms, $n$ is 2, $R^2$ is the methyl radical positioned in the ortho and meta positions, and X is the bromine atom.

7. A compound of claim 1 wherein Y is the hydrogen atom, $R^1$ is t-alkyl having not more than 5 carbon atoms, $n$ is 1, $R^2$ is the chlorine atom positioned in the ortho position, and X is the bromine atom.

8. A compound of claim 1 wherein said compound is 2′-tert-butyl-2-chloro-N-formyl-6′-methylacetanilide.

9. A compound of claim 1 wherein said compound is 2′-tert-butyl-2-chloro-6′-ethyl-N-formylacetanilide.

10. A compound of claim 1 wherein said compound is 2′-tert-butyl-2-chloro-5′,6′-dimethyl-N-formylacetanilide.

11. A compound of claim 1 wherein said compound is 2-bromo-2′-tert-butyl-5′,6′-dimethyl-N-formylacetanilide.

12. A compound of claim 1 wherein said compound is 2,2′-dichloro-N-formyl-6′-tert-pentylacetanilide.

References Cited

FOREIGN PATENTS 622,131   12/1962   Belgium _____ 260—562

OTHER REFERENCES

Arbuzov et al.: Doklady Akad. Nau S.S.S.R., vol. 141, pp. 349–52 (1961).

Bohme et al.: Chem. Ber., vol. 96, pp. 600–3 (February 1963).

Cramer et al.: Chem. Ber., vol. 93, pp. 1231–6 (1960).

Rogers et al.: Chem. Rev., vol. 61, p. 204 (1961).

HENRY R. JILES, Primary Examiner

H. I. MOATZ, Assistant Examiner

U.S. Cl. X.R.

260—566 R; 71—118